United States Patent
Ross et al.

[15] 3,684,932
[45] Aug. 15, 1972

[54] ELECTRICAL CAPACITORS WITH AMIDE IMPREGNANTS

[72] Inventors: Sidney D. Ross, Williamstown; Manuel Finkelstein, North Adams, both of Mass.

[73] Assignee: Sprague Electric Company, North Adams, Mass.

[22] Filed: Nov. 4, 1971

[21] Appl. No.: 195,780

[52] U.S. Cl. .................................. 317/258, 252/64
[51] Int. Cl. ........................................... H01g 3/195
[58] Field of Search ................... 317/258; 252/64

[56] References Cited

UNITED STATES PATENTS 3,363,156    1/1968    Cox .......................... 317/258

*Primary Examiner*—E. A. Goldberg
*Attorney*—Vincent H. Sweeney

[57] ABSTRACT

Mono-N-substituted and di-N-substituted amides are advantageously used for dielectric oil applications. The appropriate substitution provides the amides with the required physical and electrical characteristics necessary for use as a dielectric liquid in AC and energy storage capacitors.

10 Claims, 1 Drawing Figure

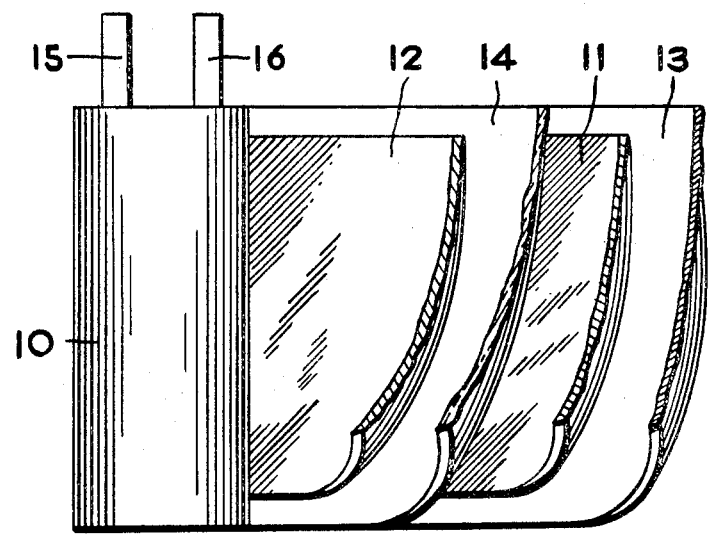

ELECTRICAL CAPACITORS WITH AMIDE IMPREGNANTS

BACKGROUND OF THE INVENTION

This invention relates to amide impregnants for electrical capacitors, and more particularly to the use of mono-N-substituted and di-N-substituted amides as dielectric liquids in electrical capacitors.

A suitable dielectric liquid for AC and energy storage capacitors must have the following physical and electrical characteristics: (1) freezing point and pour point below −40° C; (2) negligible vapor pressure at 125° C and 10 microns; (3) flash point greater than 350° F; (4) viscosity of 1,000 centipoises or less at 100° C; (5) dielectric constant greater than 2.4 but smaller than 10; (6) volume resistivity in excess of $10^{10}$ ohm-cm; and (7) power factor of less than 0.1 percent and preferably less than 0.05 percent.

Many amides meet these requirements but lack the sufficient hydrolytic stability necessary to serve as dielectrics. In the presence of water, they are in equilibrium with the components from which they are normally made. For example, an acid and an amine are generated in equivalent amount, as shown herein:

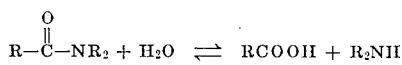

and these can react to form a conducting salt.

Amides have not been satisfactory as dielectric liquids in the past because the amide function has a very high dipole moment and therefore a dielectric constant higher than the preferred range recited above. This can be demonstrated dramatically by comparing the dielectric constant of methyl acetate ($\epsilon = 6.68$ at 25° C) with that of N-methyl-acetamide ($\epsilon = 179$ at 30° C) and N,N-dimethylacetamide ($\epsilon = 37$ at 25° C). The very large dielectric constant of N-methylacetamide is attributable to intermolecular hydrogen bonding, with the NH-grouping, the donor, and the amide carbonyl, the acceptor. This interaction effectively separates the distance between the positive and negative ends of the operating dipole and results in the large observed dielectric constant. For this reason, as well as some susceptibility to hydrolytic attack, amides have been neglected in the search for dielectric liquids suitable for use in AC and energy storage capacitors.

Accordingly, it is an object of the present invention to provide amides that are suitable for use in AC and energy storage capacitors, that is, providing amides whose dielectric constants lie within the range of from 2.4 to 10.

It is another object of this invention to provide amide impregnants for electrical capacitors that are virtually insensitive to hydrolytic attack.

SUMMARY OF THE INVENTION

In accordance with the present invention there is provided a capacitance section sealed within a capacitor housing. The capacitance section comprises at least a pair of electrodes and a dielectric spacer between the electrodes. The capacitor is fully impregnated with at least a major proportion of appropriately substituted amides. The amides are virtually insensitive to hydrolytic attack because of appropriate substitution in both the acid and amine moieties used to prepare these amides. The amides produced herein have dielectric constants of from 2.4 to 10.

Mono-N-substituted and di-N-substituted amides advantageously have the required physical and electrical characteristics necessary for use as a dielectric liquid in AC and energy storage capacitors.

BRIEF DESCRIPTION OF THE DRAWING

The drawing illustrates a capacitance section 10 of the type with which the present invention is concerned. This section will be positioned within a capacitor container or housing means (not shown) and later impregnated with the fluid dielectric of the present invention. Section 10 comprises a convolutely wound section having metal electrodes 11 and 12 separated by dielectric spacers 13 and 14, such as polypropylene film or Kraft paper. The capacitance section has electrode tabs 15 and 16 which are in contact with electrodes 11 and 12 and which will thereafter make contact to the underside of a conventional capacitor can cover assembly containing tab terminals.

DESCRIPTION OF THE PREFERRED EMBODIMENTS

Amides can advantageously be used as dielectric impregnants for AC and energy storage capacitors when in their mono-N-substituted and di-N-substituted forms. Some of these structures effectively render their amides impervious to hydrolytic attack by water or hydroxide ion, effectively lower the dielectric constants so as to be in the advantageous range of 2.4 to 10, and makes the amides more compatible with a polyolefin film such as polypropylene.

The hydrolysis of an amide involves attack by water or hydroxide ion at the carbonyl carbon atom. The reaction can be both acid and base catalyzed, but a typical dielectric fluid would be essentially neutral, and the hydrolysis of concern would involve attack by a neutral water molecule. Where alkyl substituents are introduced at the 2-position of the acid moiety and the 1-position of the amine moiety, the ease of hydrolysis is dramatically diminished. The alkyl substituents should be positioned on the amide $\alpha$ to the carbonyl carbon atom and/or $\alpha$ to the amide nitrogen.

The amide function has a very high dipole moment, and consequently a very large dielectric constant. The high dielectric constants are generally attributable to intermolecular hydrogen bonding, with the NH-grouping, the donor, and the amide carbonyl, the acceptor. This interaction effectively separates the distance between the positive and negative ends of the operating dipole and results in the large observed dielectric constant. With alkyl substituents at the 2-position of the acid moiety and the 1-position of the amine moiety, a steric barrier to such intermolecular hydrogen bonding is introduced, and the dielectric constants are significantly reduced in magnitude. Generally, it can be said that relatively large alkyl substituents are necessary to obtain oils with the desired dielectric constants.

The relatively large dielectric constants of the N,N-disubstituted amides are also due to coupling of the dipole moments of the amide function:

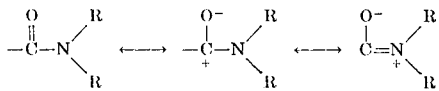

and, in these compounds too, appropriate substitution can impose a ste-ric barrier to dipole-dipole interaction and consequently result in significantly lower dielectric constants.

Amides having the desired structures can be prepared by the following processes: (a) pyrolysis of amine salts; (b) aminolysis of an ester; and (c) reaction of an acid chloride with an amide. Both 2-substituted carboxylic acids and 1-substituted primary amines are readily available from the chemical industry. N,N-disubstituted amides can be obtained by prior N-alkylation of the commercially available 1-substituted primary amines or by alkylation of N-mono-substituted amides. The necessary building blocks for the appropriately substituted amides can be produced by various chemical processes such as the catalyzed addition of carbon monoxide to olefins to form neo-acids and the catalyzed addition of HCN to olefins to ultimately give branched amines. Since the amide notrogen is trivalent, the amides can be unsubstituted, monosubstituted or disubstituted on the nigrogen atom; however, the N-unsubstituted amides, $RCONH_2$, are extremely polar and are not of interest herein.

The freezing point of these amides should be below $-40°$ C, and the vapor pressure must be negligible at 100 microns and $125°$ C for paper capacitors and 100 microns and $100°$ C for plastic film capacitors. The visocity must not exceed 1,000 centipoises at the impregnation temperature ($125°$ C for paper capacitors and $100°$ C or less for film capacitors). The power factor of such appropriately substituted amides should be less than 0.1 percent for paper and less than 0.05 percent for film capacitors. And, flash point in excess of $350°$ F is needed.

It is more advantageous to impregnate the capacitance section with a liquid dielectric and one that does not set upon standing, as such an arrangement produces air gaps therein that inhibit complete impregnation and result in failure of the capacitor under voltage because of sparking and corona. Therefore when using these amides, it is preferred that blends be used in some cases so as to insure that the impregnant be used in its liquid form.

We have found the following classes of amides to be suit-able for use as dielectric liquids:

(I) 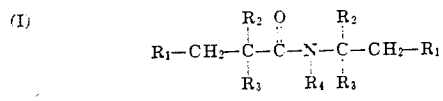

wherein $R_1$ is a $C_1-C_{18}$ alkyl group; $R_2$ is a member selected from $CH_3$ and $C_2H_5$; $R_3$ is a member selected from $CH_3$ and H; and $R_4$ is a member selected from H and a $C_1-C_{18}$ alkyl group.

Preferred compounds are those in which $R_2$ and $R_3$ are $CH_3$, and $R_4$ is H; and those in which $R_2$ and $R_3$ are $CH_3$, and $R_4$ is a $C_1-C_{18}$ alkyl group.

(II) 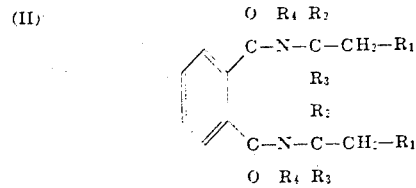

wherein $R_1$ is a $C_1-C_{18}$ alkyl group; $R_2$ is a member selected from $CH_3$ and $C_2H_5$; $R_3$ is a member selected from $CH_3$ and H; and $R_4$ is a member selected from H and a $C_1-C_{18}$ alkyl group.

Preferred compounds are those in which $R_2$ and $R_3$ are $CH_3$ and $R_4$ is H; and those in which $R_2$ and $R_3$ are $CH_3$ and $R_4$ is a $C_1-C_{18}$ alkyl group.

(III) 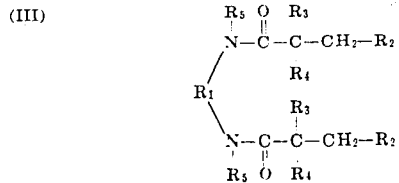

wherein $R_1$ is an alkyl grouping separating the two nitrogens; $R_2$ is a $C_1-C_{18}$ alkyl group; $R_3$ is a member selected from $CH_3$ and $C_2H_5$; $R_4$ is a member selected from $CH_3$ and H; and $R_5$ is a member selected from H and a $C_1-C_{18}$ alkyl group.

Preferred compounds are those in which $R_3$ and $R_4$ are $CH_3$, and $R_5$ is H: and those in which $R_3$ and $R_4$ are $CH_3$ and $R_5$ is a $C_1-C_{18}$ alkyl group.

(IV) 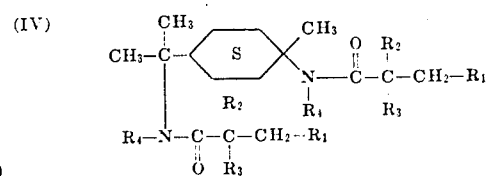

wherein

is a cyclohexane ring; $R_1$ is a $C_1-C_{18}$ alkyl group; $R_2$ is a member selected from $CH_3$ and $C_2H_5$; $R_3$ is a member selected from $CH_3$ and H; and $R_4$ is a member selected from H and a $C_1-C_{18}$ alkyl group.

Preferred compounds are those in which $R_2$ and $R_3$ are $CH_3$ and $R_4$ is H; and those in which $R_2$ and $R_3$ are $CH_3$ and $R_4$ is a $C_1-C_{18}$ alkyl group.

It should be noted that menthane diamine,

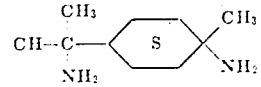

is readily available from the chemical industry.

(V) 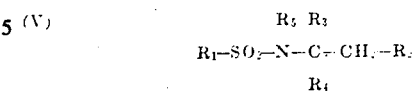

wherein $R_1$ is an alkyl or aryl group; $R_2$ is a $C_1-C_{18}$ alkyl group; $R_3$ is a member selected from $CH_3$ and $C_2H_5$; $R_4$ is a member selected from $CH_3$ and H; and $R_5$ is H or a $C_1-C_{18}$ alkyl group.

Preferred compounds are those in which $R_1$ is phenyl, $R_5$ is H and $R_3$ and $R_4$ are $CH_3$; and those in which $R_1$ is phenyl; $R_5$ is a $C_1-C_{18}$ alkyl group; and $R_3$ and $R_4$ are $CH_3$.

(VI) 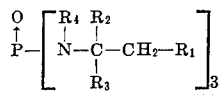

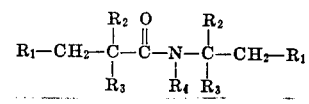

wherein $R_1$ is a $C_1$–$C_{18}$ alkyl group; $R_2$ is a member selected from $CH_3$ and $C_2H_5$; $R_3$ is a member selected from $CH_3$ and H; and $R_4$ is a member selected from H and a $C_1$–$C_{18}$ alkyl group.

Preferred compounds are those in which $R_2$ and $R_3$ are $CH_3$ and $R_4$ is H; and those in which $R_2$ and $R_3$ are $CH_3$ and $R_4$ is a $C_1$–$C_{18}$ alkyl group.

The amides listed herein can advantageously be used as dielectric impregnants. Various mixtures or blends thereof have also been found to meet the requirements for dielectric impregnants for paper and film capacitors. The capacitance section of a capacitor is to be fully impregnated therewith.

The polyolefin films contemplated by the present invention include polypropylene, polyethylene, polystyrene, etc. It is preferred to employ isotactic polypropylene of fairly high purity. This type of polypropylene is presently commercially available from several different sources. For some purposes it is advisable to employ in conjunction with the polymer film a porous cellulosic type spacer to assist in impregnation and to act as a wick for the liquid impregnant. A commonly employed material for this purpose is Kraft paper. It is also contemplated that one or both of the capacitor electrodes may be in the form of a thin metallization on the surface of the polyolefin film, such as aluminized polypropylene. And further, the capacitor electrodes may be in the form of a thin metallization on both surfaces of a porous paper such that the metal on one surface intermittently contacts the metal-lization on the other surface, the electrodes being separated by a plastic film dielectric. Because these amides are so stable, they should not produce any acid, and therefore are advantageously compatible with these metallized electrodes, unlike the chlorinated hydrocarbon impregnants used in the prior art.

Since it is obvious that many changes and modifications can be made in the above-described details without departing from the nature and spirit of the invention, it is to be understood that the invention is not limited to said details except as set forth in the appended claims.

What is claimed is:

1. An electrical capacitor comprising a capacitor housing; a capacitance section within said housing, said section having at least a pair of electrodes and a dielectric spacer between said electrodes, said section being impregnated with a liquid dielectric comprising at least one amide having alkyl groups substituted thereon, said at least one amide being a member selected from mono-N-substituted amides and di-N-substituted amides, said alkyl substituents being on at least one position on said amide selected from the group consisting of α to the carbonyl carbon atom and α to the amide nitrogen.

2. The capacitor of claim 1 wherein said liquid dielectric is at least one alkyl substituted amide of the formula wherein $R_1$ is a $C_1$–$C_{18}$ alkyl group; $R_2$ is a member selected from $CH_3$ and $C_2H_5$; $R_3$ is a member selected from $CH_3$ and H; and $R_4$ is a member selected from H and a $C_1$–$C_{18}$ alkyl group.

3. The capacitor of claim 1 wherein said liquid dielectric is at least one alkyl substituted amide of the formula

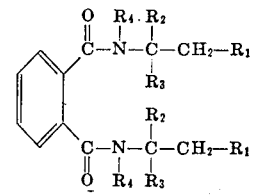

wherein $R_1$ is a $C_1$–$C_{18}$ alkyl group; $R_2$ is a member selected from $CH_3$ and $C_2H_5$; $R_3$ is a member selected from $CH_3$ and H; and $R_4$ is a member selected from H and a $C_1$–$C_{18}$ alkyl group.

4. The capacitor of claim 1 wherein said liquid dielectric is at least one alkyl substituted amide of the formula

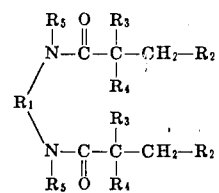

wherein $R_1$ is an alkyl grouping separating the two nitrogens; $R_2$ is a $C_1$–$C_{18}$ alkyl group; $R_3$ is a member selected from $CH_3$ and $C_2H_5$; $R_4$ is a member selected from $CH_3$ and H; and $R_5$ is a member selected from H and a $C_1$–$C_{18}$ alkyl group.

5. The capacitor of claim 1 wherein said liquid dielectric is at least one alkyl substituted amide of the formula

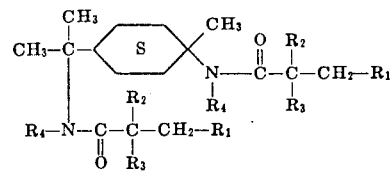

wherein

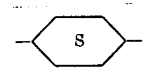

is a cyclohexane ring; $R_1$ is a $C_1$–$C_{18}$ alkyl group; $R_2$ is a member selected from $CH_3$ and $C_2H_5$; $R_3$ is a member selected from $CH_3$ and H; and $R_4$ is a member selected from H and a $C_1$–$C_{18}$ alkyl group.

6. The capacitor of claim 1 wherein said liquid dielectric is at least one alkyl substituted amide of the formula

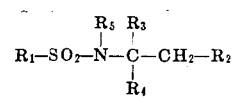

wherein $R_1$ is a hydrocarbon grouping selected from the group consisting of alkyl and aryl; $R_2$ is a $C_1$-$C_{18}$ alkyl group; $R_3$ is a member selected from $CH_3$ and $C_2H_5$; $R_4$ is a member selected from $CH_3$ and H; and $R_5$ is a member selected from H and a $C_1$-$C_{18}$ alkyl group.

7. The capacitor of claim 1 wherein said liquid dielectric is at least one alkyl substituted amide of the formula

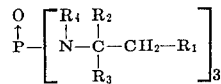

wherein $R_1$ is a $C_1$-$C_{18}$ alkyl group; $R_2$ is a member selected from $CH_3$ and $C_2H_5$; $R_3$ is a member selected from $CH_3$ and H; and $R_4$ is a member selected from H and a $C_1$-$C_{18}$ alkyl group.

8. The capacitor of claim 1 wherein said electrodes are in the form of a thin metallization on each surface of a porous paper.

9. The capacitor of claim 1 wherein said dielectric spacer is a polyolefin film, and wherein at least one of said electrodes is in the form of a metallized layer deposited on a surface of said polyolefin film.

10. The capacitor of claim 9 wherein said metallized layer is aluminum.

* * * * *